United States Patent
Fang et al.

(10) Patent No.: US 10,203,544 B2
(45) Date of Patent: Feb. 12, 2019

(54) POLARIZER, MANUFACTURING METHOD THEREOF, LIQUID CRYSTAL DISPLAY PANEL AND DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Kaidi Fang, Beijing (CN); Zhengwei Zhu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 389 days.

(21) Appl. No.: 14/912,906

(22) PCT Filed: Jul. 10, 2015

(86) PCT No.: PCT/CN2015/083758
§ 371 (c)(1),
(2) Date: Feb. 18, 2016

(87) PCT Pub. No.: WO2016/155141
PCT Pub. Date: Oct. 6, 2016

(65) Prior Publication Data
US 2017/0038639 A1    Feb. 9, 2017

(30) Foreign Application Priority Data

Mar. 31, 2015 (CN) .......................... 2015 1 0147922

(51) Int. Cl.
*G02F 1/1335* (2006.01)
*G02F 1/1343* (2006.01)
*G02F 1/1368* (2006.01)
*G02B 5/30* (2006.01)

(52) U.S. Cl.
CPC ...... *G02F 1/133528* (2013.01); *G02F 1/1335* (2013.01); *G02F 1/133512* (2013.01);
(Continued)

(58) Field of Classification Search
CPC ................ G02F 1/1368; G02F 1/1335; G02F 1/133528; G02F 1/133512
(Continued)

(56) References Cited

U.S. PATENT DOCUMENTS

2003/0155588 A1    8/2003  Murade
2014/0098315 A1*   4/2014  Jung ................ G02F 1/136209
                                                         349/42
(Continued)

FOREIGN PATENT DOCUMENTS

CN    1195786 A    10/1998
CN    1438523 A    8/2003
(Continued)

OTHER PUBLICATIONS

Decision on Rejection in Chinese Application No. 201510147922.X dated Jun. 2, 2017, with English translation.
(Continued)

*Primary Examiner* — Thanh Nhan P Nguyen
(74) *Attorney, Agent, or Firm* — Womble Bond Dickinson (US) LLP

(57) ABSTRACT

The embodiments of the present invention disclose a polarizer, a manufacturing method thereof, a liquid crystal display panel and a display device. The polarizer comprises: a polarizing film and a shielding layer located on the polarizing film; wherein the shielding layer comprises a shielding portion for at least covering channels of thin film transistors in the liquid crystal display panel; when the polarizer is used as a lower polarizer in the liquid crystal display panel, the shielding layer additionally arranged on the polarizer can
(Continued)

shield the channels of the thin film transistors in the liquid crystal display panel so as to enable them not to be irradiated by the backlight, in this way, it can avoid the thin film transistors from generating leakage current when the channels of the thin film transistors are irradiated by the backlight, thereby being capable of avoiding the liquid crystal display panel from generating defects such as flicker and crosstalk, which may influence the display quality of the liquid crystal display panel.

16 Claims, 5 Drawing Sheets

(52) U.S. Cl.
CPC .......... *G02B 5/3033* (2013.01); *G02F 1/1368* (2013.01); *G02F 1/134309* (2013.01); *G02F 2001/133562* (2013.01); *G02F 2001/133567* (2013.01)

(58) Field of Classification Search
USPC .............................................. 349/43, 46, 110
See application file for complete search history.

(56) References Cited

U.S. PATENT DOCUMENTS

2014/0118656 A1* 5/2014 Jang .................. G02F 1/133528
349/44
2016/0154283 A1* 6/2016 Kimura ............. G02F 1/134363
349/46
2018/0004049 A1* 1/2018 Jung ................. G02F 1/134336

FOREIGN PATENT DOCUMENTS

| | | |
|---|---|---|
| CN | 102854558 A | 1/2013 |
| CN | 102879944 | 1/2013 |
| CN | 202677026 | 1/2013 |
| CN | 202677026 U | 1/2013 |
| CN | 202929329 U | 5/2013 |
| CN | 203178632 | 9/2013 |
| CN | 104698525 | 6/2015 |
| JP | 2008233729 | 10/2008 |

OTHER PUBLICATIONS

Office Action in Chinese Application No. 201510147922.X dated Mar. 21, 2017, with English translation. 14 pages.
Office Action in Chinese Application No. 201510147922.X dated Nov. 7, 2016, with English translation. 11 pages.
International Search Report and Written Opinion with English Language Translation, dated Nov. 25, 2015, Application No. PCT/CN2015/083758.
Office Action in Chinese Application No. 201510147922X with English translation. 14 pages.

* cited by examiner

POLARIZER, MANUFACTURING METHOD THEREOF, LIQUID CRYSTAL DISPLAY PANEL AND DISPLAY DEVICE

FIELD OF THE INVENTION

The present invention relates to the field of display technology, particularly to a polarizer, a manufacturing method thereof, a liquid crystal display panel and a display device.

BACKGROUND OF THE INVENTION

In the existing display device, the liquid crystal display (LCD) has the advantages of lower power consumption, high display quality, free of electromagnetic radiation and wide range of applications, and is a relatively important display device at present.

The liquid crystal display generally comprises a liquid crystal display panel and a backlight module for providing light sources for the liquid crystal display panel; wherein the liquid crystal display panel comprises a lower polarizer, an array substrate, a liquid crystal layer, a counter substrate and an upper polarizer from bottom to top successively; the light emitted from the backlight module is emitted to the array substrate in the liquid crystal display panel through the lower polarizer.

In the existing liquid crystal display, thin film transistors (TFT) and pixel electrodes are generally arranged at a side of the array substrate facing the liquid crystal layer, the light emitted from the backlight module will irradiate the TFT on the array substrate through the lower polarizer, the TFT on the array substrate will generate leakage current after being irradiated by the backlight. Take the bottom gate type TFT as an example for illustration, the gate electrode in the bottom gate type TFT is located below the active layer; theoretically, the gate electrode can shield the TFT channels from being irradiated by the backlight; however, it is difficult for the actual manufacturing process to ensure that all the TFT channels can be shielded by the gate electrode completely; moreover, the conditions of the TFT channels at different positions on the array substrate being irradiated by the backlight are different; therefore, the leakage currents generated by the TFTs at different positions on the array substrate will be different, thereby causing the voltages of the pixel electrodes at different positions on the array substrate to be different, generating defects such as flicker and crosstalk in the liquid crystal display, which may influence display quality of the liquid crystal display.

SUMMARY OF THE INVENTION

In view of this, the embodiments of the present invention provide a polarizer, a manufacturing method thereof, a liquid crystal display panel and a display device, for solving the problem of defects such as flicker and crosstalk caused by backlight irradiation to the thin film transistors in the prior art.

Therefore, an embodiment of the present invention provides a polarizer applied in a liquid crystal display panel, comprising: a polarizing film and a shielding layer located on the polarizing film;

the shielding layer comprising a shielding portion for at least covering channels of thin film transistors in the liquid crystal display panel.

In a possible implementing mode, in the above polarizer provided by an embodiment of the present invention, the shielding layer comprises a plurality of shielding portions in one-to-one correspondence with the thin film transistors in the liquid crystal display panel;

a shape of each of the shielding portions is consistent with a shape of a corresponding thin film transistor, a size of each of the shielding portions is greater than or equal to a size of a corresponding thin film transistor.

In a possible implementing mode, in the above polarizer provided by an embodiment of the present invention, the shielding portion and a black matrix in the liquid crystal display panel have a consistent shape, same size and corresponding position.

In a possible implementing mode, in the above polarizer provided by an embodiment of the present invention, the material of the shielding portion is a material of a black matrix in the liquid crystal display panel.

An embodiment of the present invention further provides a liquid crystal display panel comprising: a liquid crystal cell, an upper polarizer and a lower polarizer; wherein the liquid crystal cell is arranged between the upper polarizer and the lower polarizer;

the lower polarizer is the above polarizer provided by an embodiment of the present invention.

In a possible implementing mode, in the above liquid crystal display panel provided by an embodiment of the present invention, the liquid crystal cell comprises: a counter substrate and an array substrate arranged oppositely, and a liquid crystal layer located between the counter substrate and the array substrate; wherein thin film transistors are arranged at a side of the array substrate facing the liquid crystal layer;

each thin film transistor comprises: a gate electrode and an active layer insulated from each other, a source electrode and a drain electrode electrically connected with the active layer respectively; wherein the source electrode and the drain electrode are both located over the active layer; the gate electrode is located below the active layer.

In a possible implementing mode, in the above liquid crystal display panel provided by an embodiment of the present invention, the liquid crystal cell comprises: a counter substrate and an array substrate arranged oppositely, and a liquid crystal layer located between the counter substrate and the array substrate; wherein thin film transistors are arranged at a side of the array substrate facing the liquid crystal layer;

each thin film transistor comprises: a gate electrode and an active layer insulated from each other, a source electrode and a drain electrode electrically connected with the active layer respectively; wherein the source electrode and the drain electrode are both located over the active layer; the gate electrode is located over the source electrode and the drain electrode.

An embodiment of the present invention further provides a display device comprising: the above liquid crystal display panel provided by an embodiment of the present invention and a backlight module; wherein the lower polarizer in the liquid crystal display panel is closed to the backlight module.

An embodiment of the present invention further provides a method of manufacturing a polarizer, the polarizer being applied in a liquid crystal display panel, comprising:

forming a polarizing film;

forming a shielding layer on the polarizing film; wherein the shielding layer comprises a shielding portion for at least covering channels of thin film transistors in the liquid crystal display panel.

In a possible implementing mode, in the above method provided by an embodiment of the present invention, forming a shielding layer comprises:

forming patterns of a plurality of shielding portions in one-to-one correspondence with the thin film transistors in the liquid crystal display panel using a composition process; wherein a shape of each of the shielding portions is consistent with a shape of a corresponding thin film transistor, a size of each of the shielding portions is greater than or equal to a size of a corresponding thin film transistor.

In a possible implementing mode, in the above method provided by an embodiment of the present invention, forming a shielding layer comprises:

forming pattern of a shielding portion having a consistent shape, same size and corresponding position with a black matrix in the liquid crystal display panel using a composition process.

In a possible implementing mode, in the above method provided by an embodiment of the present invention, forming a shielding layer comprises:

forming a shielding portion using a material of a black matrix in the liquid crystal display panel.

In the above polarizer, the manufacturing method thereof, the liquid crystal display panel and the display device provided by the embodiments of the present invention, the polarizer comprises: a polarizing film and a shielding layer located on the polarizing film; wherein the shielding layer comprises a shielding portion for at least covering channels of thin film transistors in the liquid crystal display panel; when the polarizer is used as a lower polarizer in the liquid crystal display panel, the shielding layer additionally arranged on the polarizer can shield the channels of the thin film transistors in the liquid crystal display panel so as to enable them not to be irradiated by the backlight, in this way, it can avoid the thin film transistors from generating leakage current when the channels of the thin film transistors are irradiated by the backlight, thereby being capable of avoiding the liquid crystal display panel from generating defects such as flicker and crosstalk, which may influence the display quality of the liquid crystal display panel.

DETAILED DESCRIPTION OF THE INVENTION

Figure 1:
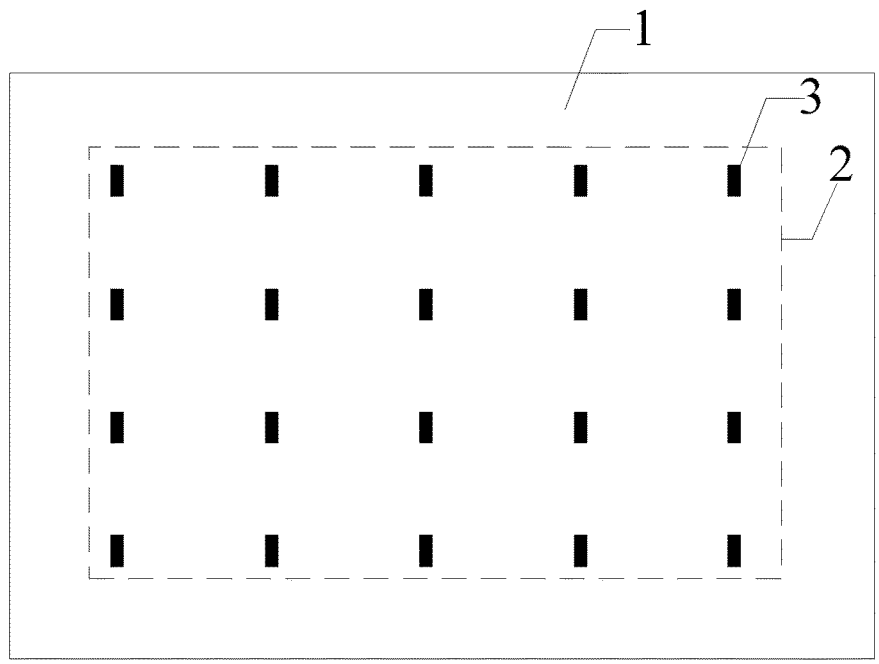
FIG. 1 to FIG. 3 are structural schematic views of a polarizer provided by a embodiment of the present invention.

Next, the specific implementing modes of a polarizer, a manufacturing method thereof, a liquid crystal display panel and a display device provided by the embodiments of the present invention will be explained in detail with reference to the drawings.

The shapes and thickness of respective film layers in the drawings do not reflect the real proportions thereof, which only aim to schematically explaining the contents of the present invention.

Figure 2:
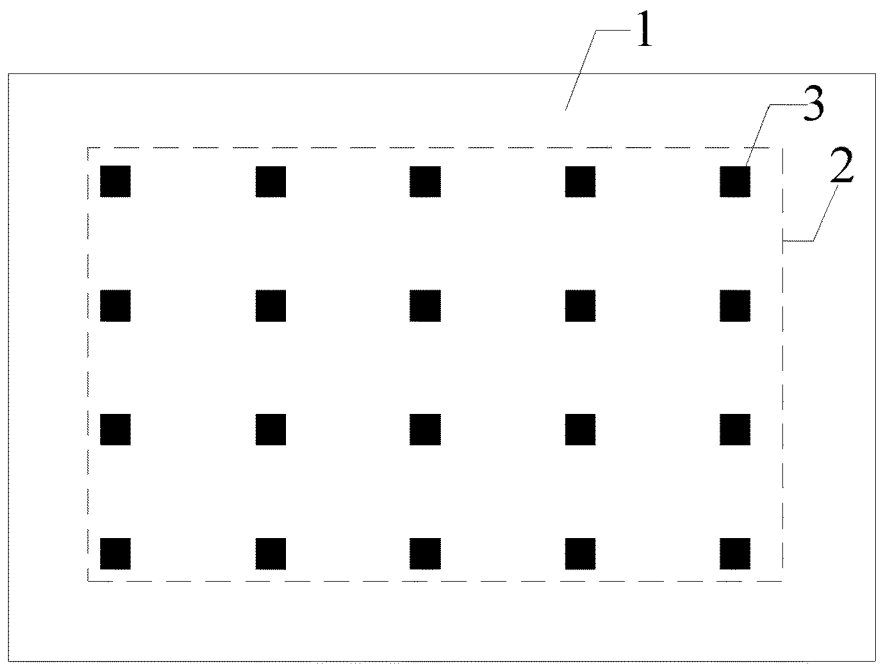
Figure 3:
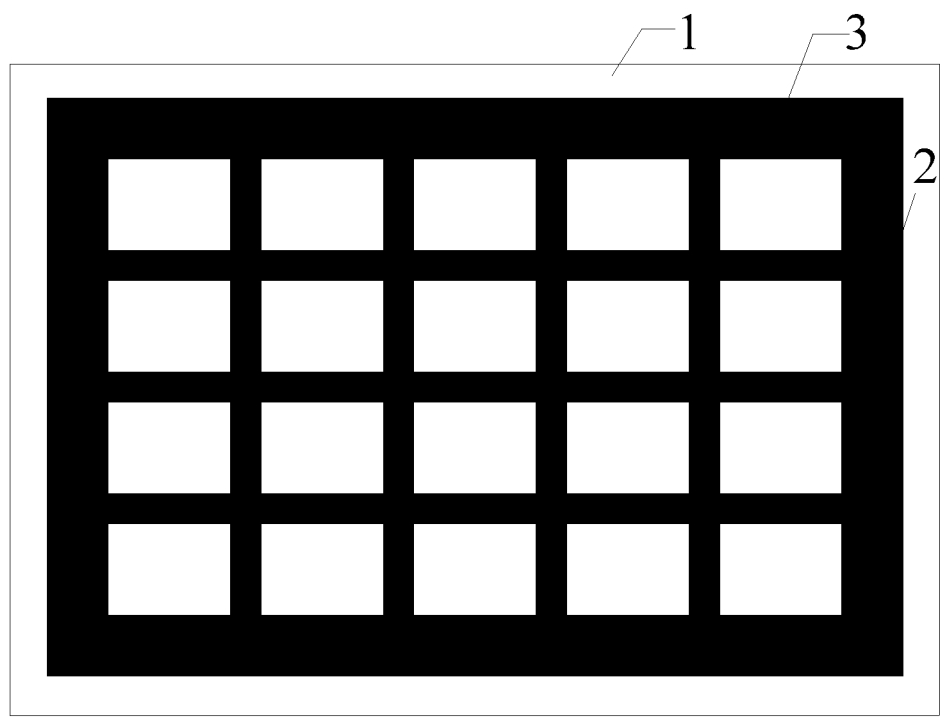

An embodiment of the present invention provides a polarizer applied in a liquid crystal display panel, as shown in FIG. 1 to FIG. 3, comprising: a polarizing film 1; further comprising: a shielding layer 2 located on the polarizing film 1;

The shielding layer 2 comprises a shielding portion(s) 3 for at least covering channels of thin film transistors in the liquid crystal display panel.

In the above polarizer provided by an embodiment of the present invention, since a shielding layer for at least covering the channels of the thin film transistors in the liquid crystal display panel is additionally arranged on the polarizer, thus, when the polarizer is used as the lower polarizer (i.e., the polarizer close to the backlight module) in the liquid crystal display panel, the shielding layer additionally arranged on the polarizer can shield the channels of the thin film transistors in the liquid crystal display panel so as to enable them not to be irradiated by the backlight, thereby being capable of avoiding the thin film transistors from generating leakage current when the channels of the thin film transistors are irradiated by the backlight, so as to be capable of avoiding the liquid crystal display panel from generating defects such as flicker and crosstalk, which may influence the display quality of the liquid crystal display panel.

Figure 4:
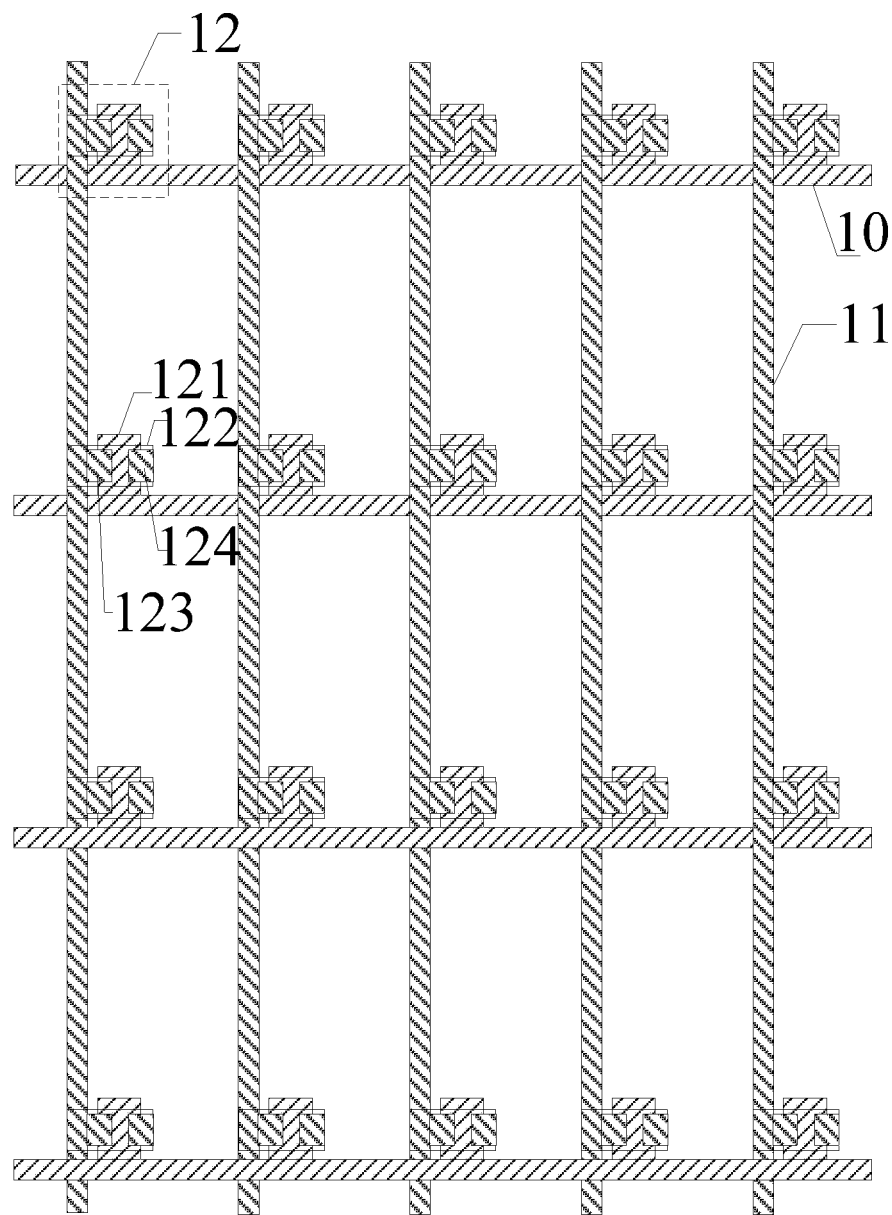
FIG. 4 is a structural schematic view of an array substrate in an existing liquid crystal display panel.

Generally, on the array substrate of the existing liquid crystal display panel, as shown in FIG. 4, a plurality of gate lines 10 and a plurality of data lines 11 insulated from each other and arranged in cross with each other are arranged, thin film transistors 12 are arranged at the cross position of each gate line 10 and each data line 11, each thin film transistor 12 comprises: a gate electrode 121 and an active layer 122 insulated from each other, a source electrode 123 and a drain electrode 124 electrically connected with the active layer 122 respectively; channels are formed in an area which is between the source electrode 123 and the drain electrode 124 and corresponds to the gate electrode 121.

It needs to be explained that the thin film transistor as shown in FIG. 4 is only a structural schematic view of the existing thin film transistor, the structure of the existing thin film transistor is not limited to the structure as shown in FIG. 4, which will not be defined here.

In specific implementation, in the above polarizer provided by an embodiment of the present invention, the patterns of the shielding portions are used for at least covering the channels of the thin film transistors in the liquid crystal display panel. Specifically, as shown in FIG. 1, the patterns of the shielding portions 3 in the shielding layer 2 can only shield the areas of the channels of the thin film transistors in the corresponding liquid crystal display panel, i.e., the patterns of the shielding portions and the channels of the thin film transistors are in one-to-one correspondence, have consistent shapes and the same size; or, as shown in FIG. 2 and FIG. 3, the pattern(s) of the shielding portion(s) 3 in the shielding layer 2 can also shield the areas of the channels of the thin film transistors and the areas outside the channels on the premise of not influencing the aperture ratio of the liquid crystal display panel, which will not be defined here.

In specific implementation, in the above polarizer provided by an embodiment of the present invention, when the patterns of the shielding portions shield the areas of the channels of the thin film transistors and the areas outside the channels, as shown in FIG. 2, the shielding layer 2 can comprise a plurality of shielding portions, the plurality of shielding portions and the thin film transistors in the liquid crystal display panel are on one-to-one correspondence; the shape of each shielding portion 3 is consistent with the shape of a corresponding thin film transistor, the size of each shielding portion 3 can be equal to the size of the corresponding thin film transistor, or, the size of each shielding portion 3 can also be greater than the size of the corresponding thin film transistor, as long as it can ensure that the respective shielding portions 3 arranged will not influence the aperture ratio of the liquid crystal display panel, which will not be defined here; i.e., the patterns of the shielding portions 3 in the shielding layer 2 can shield the areas of the thin film transistors, in this way, it can avoid light leakage at the edges of the channels of the thin film transistors, so as to enable the effect of the patterns of the shielding portions 3 in the shielding layer 2 of shielding the channels of the thin film transistors from being irradiated by the backlight to be better, thereby being capable of further ensuring that the channels of the thin film transistors would not be irradiated by the backlight, so as to be capable of further ensuring that the liquid crystal display panel would not generate defects such as flicker and crosstalk, which may influence the display quality of the liquid crystal display panel.

In specific implementation, in the above polarizer provided by an embodiment of the present invention, when the pattern of the shielding portion shield the areas of the channels of the thin film transistors and the areas outside the channels, as shown in FIG. 3, the shielding portion 3 and the black matrix in the liquid crystal display panel can have a consistent shape, same size and corresponding position, i.e., the orthographic projection of the shielding portion 3 on the polarizing film 1 exactly overlap with the orthographic projection of the black matrix in the liquid crystal display panel on the polarizing film 1. In this way, the shielding layer 2 can shield the channels of the thin film transistors, so as to avoid the channels of the thin film transistors from being irradiated by the backlight directly to generate leakage current; moreover, the shielding layer 2 can also shield the data lines, and avoid the reflected light after the backlight irradiates the data lines from irradiating the channels of the thin film transistors so as to enable the thin film transistors to generate leakage current, thereby being capable of further improving the defects of flicker and crosstalk in the liquid crystal display panel.

It needs to be explained that since the shielding portion and the black matrix in the liquid crystal display panel have a consistent shape and same size, the shielding layer would not influence the aperture ratio of the liquid crystal display panel, moreover, when the pattern of the shielding layer is formed through a composition process, the same mask plate for forming the pattern of the black matrix can be used, i.e., the additionally arranged shielding layer in the above polarizer provided by an embodiment of the present invention would not increase the number of the mask plates, and would not increase the manufacturing cost; or, the shielding layer can also be directly used as the black matrix in the liquid crystal display panel to have the function of preventing light leakage of the components such as the gate lines, the data lines and the thin film transistors; in this way, the arrangement of a black matrix at one side of the counter substrate in the liquid crystal display panel can also be omitted, which simplifies the manufacturing process of the liquid crystal display panel and reduces the manufacturing cost of the liquid crystal display panel.

Certainly, in the above polarizer provided by an embodiment of the present invention, the patterns of the shielding portion(s) in the shielding layer are not limited to the shapes as shown in FIG. 1 to FIG. 3 only, the shapes of the shielding portion(s) can be adjusted appropriately based on the actual manufacturing process on the premise of not influencing the aperture ratio of the liquid crystal display panel and at least shielding the channels of the thin film transistors, which will not be defined here.

In specific implementation, in the above polarizer provided by an embodiment of the present invention, the material of the shielding portion can be a material of a black matrix in the liquid crystal display panel, the material of the black matrix in the liquid crystal display panel is similar as the material of the existing black matrix, which will not be repeated here. Certainly, other similar materials that can play the fielding function can also be used, which will not be defined here.

Figure 5:
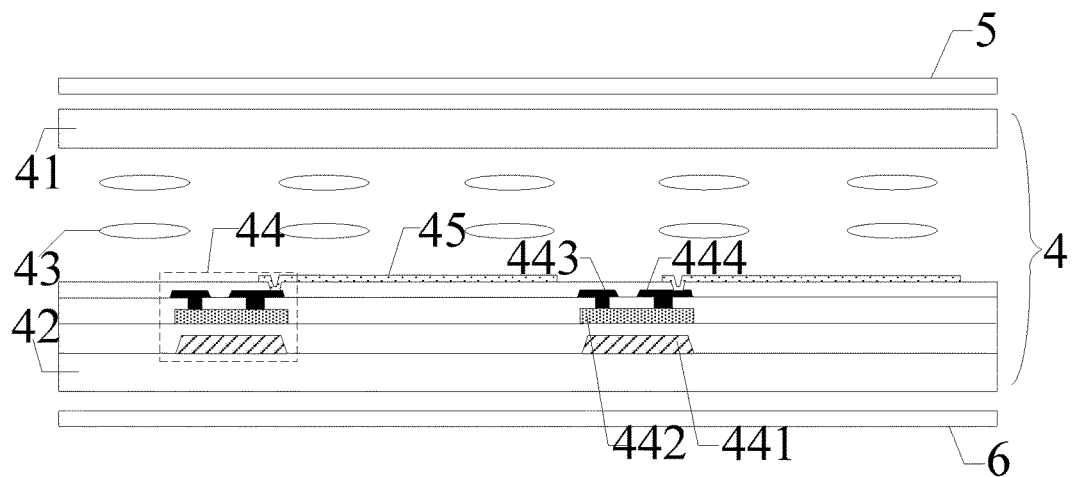
FIG. 5 and FIG. 6 are structural schematic views of a liquid crystal display panel provided by an embodiment of the present invention respectively.
Figure 6:
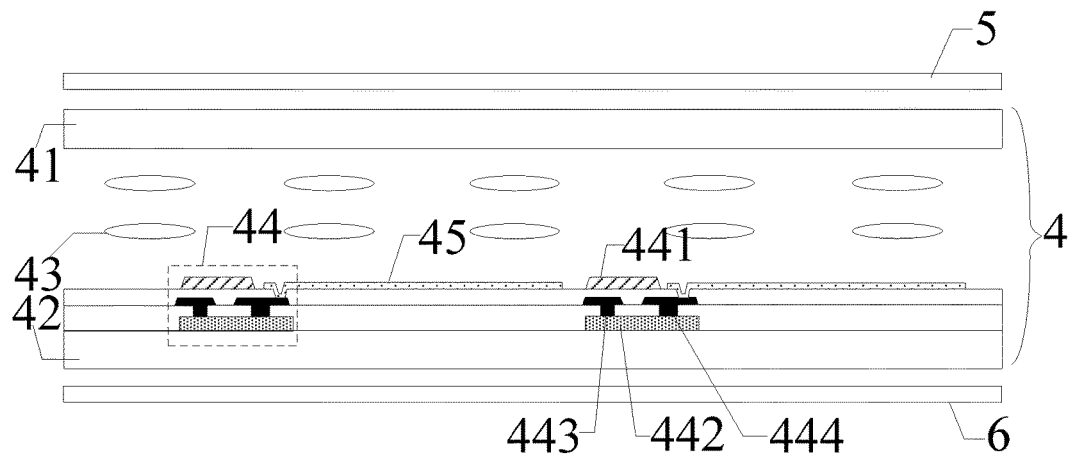

Based on the same inventive concept, an embodiment of the present invention further provides a liquid crystal display panel, as shown in FIG. 5 and FIG. 6, comprising: a liquid crystal cell 4, an upper polarizer 5 and a low polarizer 6; wherein the liquid crystal cell 4 is arranged between the upper polarizer 5 and the lower polarizer 6; the lower polarizer 6 is the above polarizer provided by an embodiment of the present invention. The implementation of the liquid crystal display panel can make reference to the implementation of the above polarizer, which will not be repeated here.

In the above liquid crystal display panel provided by an embodiment of the present invention, since a shielding layer for at least covering the channels of the thin film transistors in the liquid crystal display panel is additionally arranged on the polarizer, thus, the shielding layer additionally arranged on the polarizer can shield the channels of the thin film transistors in the liquid crystal display panel so as to enable them not to be irradiated by the backlight, thereby being capable of avoiding the thin film transistors from generating leakage current when the channels of the thin film transistors are irradiated by the backlight, so as to be capable of avoiding the liquid crystal display panel from generating defects such as flicker and crosstalk, which may influence the display quality of the liquid crystal display panel.

In specific implementation, in the above liquid crystal display panel provided by an embodiment of the present invention, as shown in FIG. 5 and FIG. 6, the liquid crystal cell 4 can specifically comprise: a counter substrate 41 and an array substrate 42 arranged oppositely, and a liquid crystal layer 43 located between the counter substrate 41 and the array substrate 42; wherein thin film transistors 44 are arranged at a side of the array substrate 42 facing the liquid crystal layer 43; wherein the specific structure of the thin film transistor 44 is similar as the structure of the existing thin film transistor, comprising: a gate electrode 441 and an active layer 442 insulated from each other, a source electrode 443 and a drain electrode 444 electrically connected with the active layer 442 respectively; a pixel electrode 45 is further arranged at the side of the array substrate 42 facing the liquid crystal layer 43, the pixel electrode 45 is electrically connected with the drain electrode 444; the above liquid crystal display panel provided by an embodiment of the present invention is particularly applicable in the case that the source electrode 443 and the drain electrode 444 in the thin film transistor are both located over the active layer 442, for example, as shown in FIG. 5, the source electrode 443 and the drain electrode 444 are both located over the active layer 442, the gate electrode 441 is located below the active layer 442; or, as shown in FIG. 6, the source electrode 443 and the drain electrode 444 are both located over the active layer 442, the gate electrode 441 is located over the source electrode 443 and the drain electrode 444; since the source electrode 443, the drain electrode 444 and the data line are arranged in the same layer, the data line is also located over the active layer 442, in this way, the reflected light after the backlight irradiates the data line will irradiate the channels of the thin film transistors more easily, the defects of flicker and crosstalk of the liquid crystal display panel can be improved apparently by additionally arranging in the lower polarizer 6 a shielding layer, which can shield the data lines and the channels.

It needs to be explained that in the above liquid crystal display panel provided by an embodiment of the present invention, the side of the lower polarizer where the shielding layer is not arranged can be attached to the array substrate; or, the side of the lower polarizer where the shielding layer is arranged can also be attached to the array substrate, which will not be defined here.

Based on the same inventive concept, an embodiment of the present invention further provides a display device comprising the above liquid crystal display panel provided by an embodiment of the present invention and a backlight module, wherein the lower polarizer in the liquid crystal display panel is close to the backlight module; the display device can be any product or component with the display function such as a mobile phone, a panel computer, a television, a display, a laptop, a digital photo frame, a navigator etc. The implementation of the display device can make reference to the implementation of the above liquid crystal display panel, which will not be repeated here.

Figure 7:
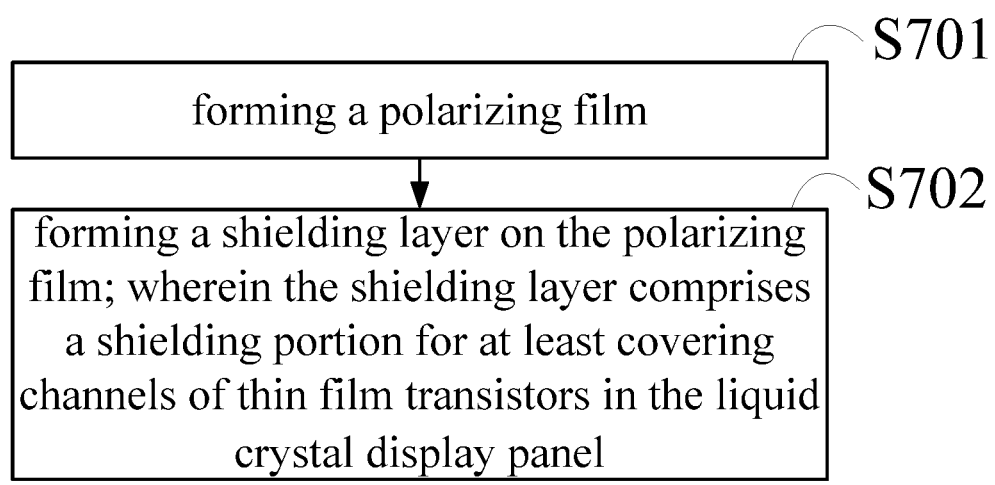
FIG. 7 is a flow chart of a method of manufacturing a polarizer provided by an embodiment of the present invention.

Based on the same inventive concept, an embodiment of the present invention further provides a method of manufacturing a polarizer, the polarizer being applied in a liquid crystal display panel, as shown in FIG. 7, comprising the steps of:

S701, forming a polarizing film;

S702, forming a shielding layer on the polarizing film; wherein the shielding layer comprises a shielding portion for at least covering channels of thin film transistors in the liquid crystal display panel.

In specific implementation, the step S702 of forming a shielding layer in the above method provided by an embodiment of the present invention can be carried out specifically in the following way: forming patterns of a plurality of shielding portions in one-to-one correspondence within the thin film transistors in the liquid crystal display panel using a composition process; wherein the shape of each the shape of each shielding portion is consistent with the shape of a corresponding thin film transistor, the size of each shielding portion can be equal to the size of the corresponding thin film transistor, or, the size of each shielding portion can also be greater than the size of the corresponding thin film transistor, as long as it can ensure that the respective shielding portions arranged will not influence the aperture ratio of the liquid crystal display panel, which will not be defined here; i.e., the patterns of the shielding portions in the shielding layer can shield the areas of the thin film transistors; in this way, it can avoid light leakage at the edges of the channels of the thin film transistors, so as to enable the effect of the patterns of the shielding portions in the shielding layer, shielding the channels of the thin film transistors from being irradiated by the backlight to be better, thereby being capable of further ensuring that the channels of the thin film transistors would not be irradiated by the backlight, so as to be capable of further ensuring that the liquid crystal display panel would not generate defects such as flicker and crosstalk, which may influence the display quality of the liquid crystal display panel.

In specific implementation, the step S702 of forming a shielding layer in the above method provided by an embodiment of the present invention can be carried out specifically in the following way: forming a pattern of a shielding portion which has a consistent shape, same size and corresponding position with a black matrix in the liquid crystal display panel using a composition process, in this way, the shielding layer can shield the channels of the thin film transistors, so as to avoid the channels of the thin film transistors from being irradiated by the backlight directly to generate leakage current, the shielding layer can also shield the data lines, and avoid the reflected light after the backlight irradiates the data lines from irradiating the channels of the thin film transistors so as to enable the thin film transistors to generate leakage current, thereby being capable of further improving the defects of flicker and crosstalk in the liquid crystal display panel.

It needs to be explained that since the shielding portion and a black matrix in the liquid crystal display panel have a consistent shape and same size, the shielding layer would not influence the aperture ratio of the liquid crystal display panel, moreover, when the pattern of the shielding layer is formed through a composition process, the same mask plate for forming the pattern of the black matrix can be used, i.e., the additionally arranged shielding layer in the above polarizer provided by an embodiment of the present invention would not increase the number of the mask plates, and would not increase the manufacturing cost; or, the shielding layer can also be directly used as the black matrix in the liquid crystal display panel to have the function of preventing light leakage of the components such as the gate lines, the data lines and the thin film transistors, in this way, the arrangement of an black matrix at one side of the counter substrate in the liquid crystal display panel can also be omitted, which simplifies the manufacturing process of the liquid crystal display panel and reduces the manufacturing cost of the liquid crystal display panel.

In specific implementation, the step S702 of forming a shielding layer in the above method provided by an embodiment of the present invention can be carried out specifically in the following way: forming a shielding portion using the material of a black matrix in the liquid crystal display panel. Certainly, other similar materials that can play the shielding function can also be used to form the shielding layer, which will not be defined here.

The embodiments of the present invention provide a polarizer, a manufacturing method thereof, a liquid crystal display panel and a display device, the polarizer comprises: a polarizing film and a shielding layer located on the polarizing film; wherein the shielding layer comprises a shielding portion for at least covering channels of thin film transistors in the liquid crystal display panel; when the polarizer is used as a lower polarizer in the liquid crystal display panel, the shielding layer additionally arranged on the polarizer can shield the channels of the thin film transistors in the liquid crystal display panel so as to enable them not to be irradiated by the backlight, in this way, it can avoid the thin film transistors from generating leakage current when the channels of the thin film transistors are irradiated by the backlight, thereby being capable of avoiding the liquid crystal display panel from generating defects such as flicker and crosstalk, which may influence the display quality of the liquid crystal display panel.

Apparently, the skilled person in the art can make various modifications and variations to the present invention without departing from the spirit and scope of the present invention. In this way, provided that these modifications and variations of the present invention belong to the scopes of the claims of the present invention and the equivalent technologies thereof, the present invention also intends to cover these modifications and variations.

The invention claimed is:

1. A polarizer applied in a liquid crystal display panel, comprising: a polarizing film and a shielding layer located on the polarizing film;
the shielding layer comprising a shielding portion for at least covering channels of thin film transistors in the liquid crystal display panel;
wherein the shielding portion and a black matrix in the liquid crystal display panel have consistent shapes, same size and corresponding positions.

2. The polarizer as claimed in claim 1, wherein the shielding layer comprises a plurality of shielding portions in one-to-one correspondence with the thin film transistors in the liquid crystal display panel;
a shape of each of the shielding portions is consistent with a shape of a corresponding thin film transistor, a size of each of the shielding portions is greater than or equal to a size of a corresponding thin film transistor.

3. The polarizer as claimed in claim 1, wherein the material of the shielding portion is a material of a black matrix in the liquid crystal display panel.

4. A liquid crystal display panel comprising: a liquid crystal cell, an upper polarizer and a lower polarizer; wherein the liquid crystal cell is arranged between the upper polarizer and the lower polarizer; wherein:
the lower polarizer is the polarizer as claimed in claim 1.

5. The liquid crystal display panel as claimed in claim 4, wherein the liquid crystal cell comprises: a counter substrate and an array substrate arranged oppositely, and a liquid crystal layer located between the counter substrate and the array substrate; wherein thin film transistor are arranged at a side of the array substrate facing the liquid crystal layer;
each thin film transistor comprises: a gate electrode and an active layer insulated from each other, a source electrode and a drain electrode electrically connected with the active layer respectively; wherein the source electrode and the drain electrode are both located over the active layer; the gate electrode is located below the active layer.

6. The liquid crystal display panel as claimed in claim 4, wherein the liquid crystal cell comprises: a counter substrate and an array substrate arranged oppositely, and a liquid crystal layer located between the counter substrate and the array substrate; wherein thin film transistors are arranged at a side of the array substrate facing the liquid crystal layer;
each thin film transistor comprises: a gate electrode and an active layer insulated from each other, a source electrode and a drain electrode electrically connected with the active layer respectively; wherein the source electrode and the drain electrode are both located over the active layer; the gate electrode is located over the source electrode and the drain electrode.

7. A display device, comprising: a liquid crystal display panel as claimed in claim 4 and a backlight module; wherein the lower polarizer in the liquid crystal display panel is close to the backlight module.

8. The display device as claimed in claim 7, wherein the shielding layer comprises a plurality of shielding portions in one-to-one correspondence with the thin film transistors in the liquid crystal display panel;
a shape of each of the shielding portions is consistent with a shape of a corresponding thin film transistor, a size of each of the shielding portions is greater than or equal to a size of a corresponding thin film transistor.

9. The display device as claimed in claim 7, wherein the material of the shielding portion is a material of a black matrix in the liquid crystal display panel.

10. The display device as claimed in claim 7, wherein the liquid crystal cell comprises: a counter substrate and an array substrate arranged oppositely, and a liquid crystal layer located between the counter substrate and the array substrate; wherein thin film transistor are arranged at a side of the array substrate facing the liquid crystal layer;
each thin film transistor comprises: a gate electrode and an active layer insulated from each other, a source electrode and a drain electrode electrically connected with the active layer respectively; wherein the source electrode and the drain electrode are both located over the active layer; the gate electrode is located below the active layer.

11. The display device as claimed in claim 7, wherein the liquid crystal cell comprises: a counter substrate and an array substrate arranged oppositely, and a liquid crystal layer located between the counter substrate and the array substrate; wherein thin film transistors are arranged at a side of the array substrate facing the liquid crystal layer;
each thin film transistor comprises: a gate electrode and an active layer insulated from each other, a source electrode and a drain electrode electrically connected with the active layer respectively;
wherein the source electrode and the drain electrode are both located over the active layer; the gate electrode is located over the source electrode and the drain electrode.

12. A method of manufacturing the polarizer as claimed in claim 1, the polarizer being applied in a liquid crystal display panel, comprising:
forming a polarizing film;
forming a shielding layer on the polarizing film; wherein the shielding layer comprises a shielding portion for at least covering channels of thin film transistors in the liquid crystal display panel; and
wherein forming a shielding layer comprises: forming a pattern of a shielding portion having consistent shape, same size and corresponding position with a black matrix in the liquid crystal display panel using a composition process.

13. The method as claim in claim 12, wherein forming a shielding layer comprises:
forming patterns of a plurality of shielding portions in one-to-one correspondence with the thin film transistors in the liquid crystal display panel using a composition process; wherein a shape of each of the shielding portions is consistent with a shape of a corresponding thin film transistor, a size of each of the shielding portions is greater than or equal to a size of a corresponding thin film transistor.

14. The method as claimed in claim 12, wherein forming a shielding layer comprises:
forming a shielding portion using a material of a black matrix in the liquid crystal display panel.

15. The liquid crystal display panel as claimed in claim 4, wherein the shielding layer comprises a plurality of shielding portions in one-to-one correspondence with the thin film transistors in the liquid crystal display panel;
a shape of each of the shielding portions is consistent with a shape of a corresponding thin film transistor, a size of each of the shielding portions is greater than or equal to a size of a corresponding thin film transistor.

16. The liquid crystal display panel as claimed in claim 4, wherein the material of the shielding portion is a material of a black matrix in the liquid crystal display panel.

* * * * *